United States Patent [19]

Morris

[11] Patent Number: 4,632,424

[45] Date of Patent: Dec. 30, 1986

[54] ENERGY ABSORPTION APPARATUS

[76] Inventor: George R. Morris, 6543 E. Abain Rd., Monroe, Mich. 48161

[21] Appl. No.: 663,426

[22] Filed: Oct. 22, 1984

[51] Int. Cl.⁴ .......................................... B60R 21/02
[52] U.S. Cl. .................................... 280/777; 180/78; 280/750
[58] Field of Search .................. 280/777, 750; 180/78; 74/492, 497, 498; 293/132

[56] References Cited

U.S. PATENT DOCUMENTS

| | | | |
|---|---|---|---|
| 3,392,599 | 7/1968 | White | 74/492 |
| 3,424,263 | 1/1969 | Black | 180/82 |
| 3,482,466 | 12/1969 | Orlich et al. | 280/777 |
| 3,492,888 | 2/1970 | Nishimura et al. | 74/492 |
| 3,505,897 | 4/1970 | Scheffler et al. | 74/492 |
| 3,523,587 | 8/1970 | Mazelsky | 180/82 |
| 3,703,106 | 11/1972 | Arntson et al. | 74/492 |
| 3,832,911 | 9/1974 | Daniel et al. | 74/492 |
| 3,851,374 | 12/1974 | Mazelsky | 29/455 |
| 3,877,319 | 4/1975 | Cooper | 74/492 |
| 3,921,747 | 11/1975 | Suzuki et al. | 180/78 |
| 3,944,244 | 3/1976 | Albrecht | 280/87 R |
| 3,960,031 | 6/1976 | Chometon et al. | 74/492 |
| 4,086,825 | 5/1978 | Badcock | 74/492 |
| 4,098,141 | 7/1978 | Yamaguchi | 74/492 |
| 4,269,043 | 5/1981 | Kizu et al. | 64/11 R |
| 4,274,299 | 6/1981 | Jones | 74/492 |
| 4,330,139 | 5/1982 | Katayama | 280/777 |
| 4,390,193 | 6/1983 | Strahan et al. | 280/777 |
| 4,411,167 | 10/1983 | Mohr | 74/492 |
| 4,531,619 | 7/1985 | Eckels | 74/492 |

Primary Examiner—Richard A. Bertsch
Attorney, Agent, or Firm—Basile, Weintraub & Hanlon

[57] ABSTRACT

An apparatus for absorbing energy between movable members. The apparatus includes first and second telescopingly engagable members. The second member is formed to be increasingly and forceably engaged with the first member as an external force is exerted on the second member urging it into the second member. In a preferred embodiment, a helical twist is formed in the second member to cause the forced engagement of the first and second members. The helical twist is variable over the longitudinal length of the second member from a first end and increases gradually from the first end to an intermediate portion an then increasingly from the intermediate portion outward towards the second end of the second member. This provides a controlled forced rate build up as the second member is urged into the first member to control energy absorption of the force urging the second member into the first member. In an alternate embodiment, the second member is formed with knurlings on opposed surfaces of varying and increasing depth from the first end to cause the increasing forced engagement of the second member into the first member.

2 Claims, 2 Drawing Figures

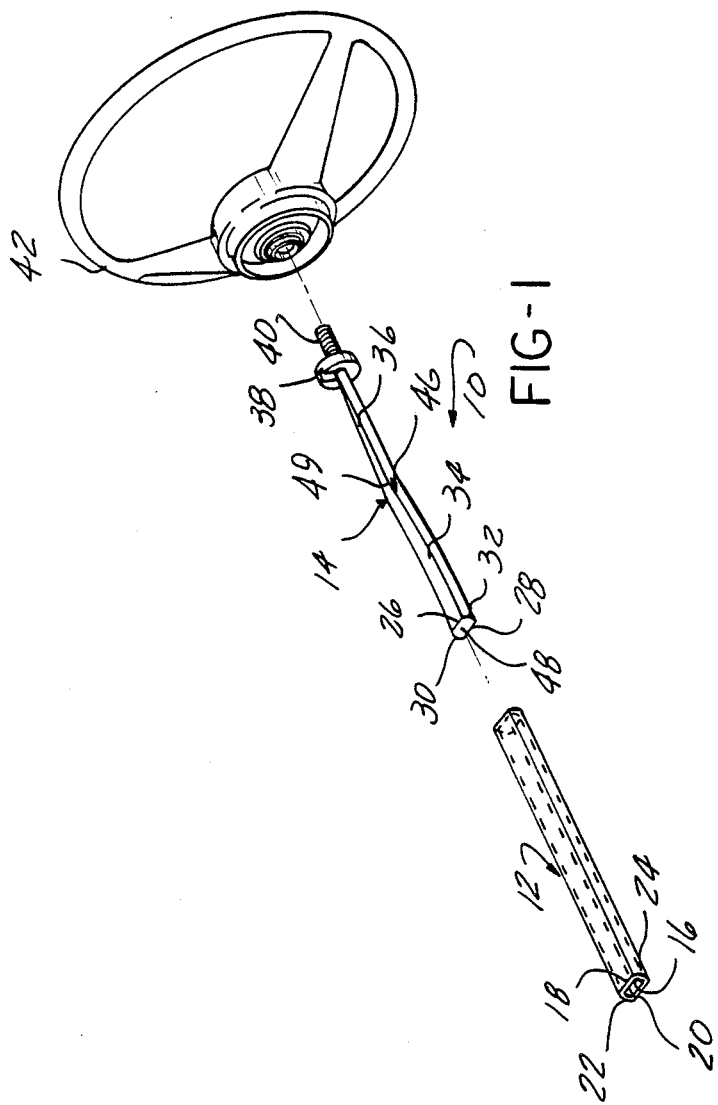
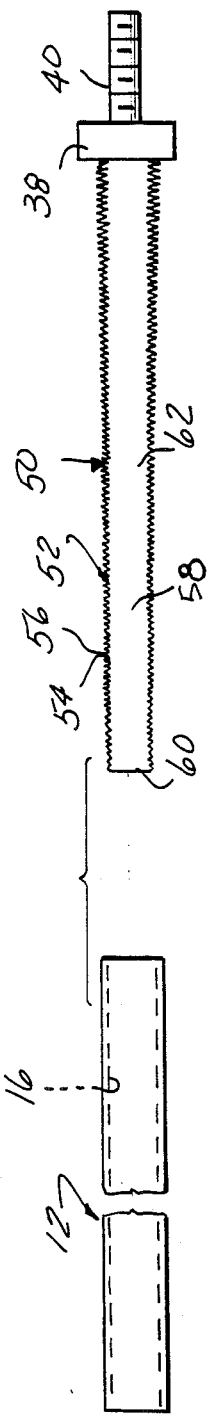

ENERGY ABSORPTION APPARATUS

BACKGROUND OF THE INVENTION

1. Field of the Invention

This invention relates, in general, to an energy absorption apparatus and, specifically, to apparatus for controlling the rate of movement of two telescoping members with respect to each other. More specifically, the present invention relates to a vehicle steering shaft assembly which collapses upon impact imposed by a human body on the steering shaft assembly.

2. Description of the Prior Art

During the collision of a motor vehicle, such as an automobile or truck, with another object, the driver is typically thrust forward into the steering wheel. Due to the rigidity of the steering wheel and supporting column, extreme forces are exerted on the driver's body which could cause severe if not fatal injuries to the driver.

As a result, numerous attempts have been made to devise a steering column which collapses when a pre-determined amount of force is exerted on the column so as to minimize the force exerted on the driver during a collision. Current steering wheel columns manufactured for motor vehicles are typically formed of two slidable sections which telescope upon impact of the driver with the steering wheel. Various elements and components have been added to the steering column to control the rate of telescoping of the first and second shafts. Most of these previously devised collapsible steering columns structures include elements or components which deform or are separated when a pre-determined force level caused by impact of the driver on the steering wheel and steering column.

Once such attempt is shown in U.S. Pat. No. 3,703,106 which discloses a steering column assembly including a combination support and guide member. The combination support and guide member is rigidly attached to the body remote from the instrument panel. The guide member includes a channel of increasing depth which receives a pair of lugs mounted on a bracket attached to the steering column. During collapse of the steering column, the lugs are progressively more tightly wedged into the combination support member to provide supplementary energy absorption.

In the collapsible steering column disclosed in this last mentioned patent, the combination support and guide member is mounted exteriorly on the steering column and interacts with lugs formed on the column structure itself. This imparts all forces during collapse on the column thereby requiring a large column structure.

The internal interconnected and rotatable shafts of the steering assembly must also telescope. Such shafts are typically secured together for rotation by means of clips and fasteners to provide the desired simultaneous rotation of both shafts, as well as to eliminate lash which causes rattle during movement of the vehicle.

However, such currently devised clips include metallic springs which hold both of the telescoping shaft members together for rotation and yet allow a collapse or telescoping of the upper member attached to the steering wheel within the lower fixed shaft member. These spring devices have a generally low fatigue life which, over increased driving miles, causes wear on the clips and therefore lash in the steering column between the two shaft members. This affects steering of the vehicle thereby leading to more difficult control of the vehicle causing driver fatigue from overcorrecting the steering or rattling noise in the steering column.

Plastic inserts or clips have also been used to connect the two telescoping shaft members together. However, such plastic inserts have a low breakaway characteristic followed by a zero collapse rate. Such plastic clips are also subject to premature shearing which again results in the above-listed problems.

The uncontrolled collapse of the steering column leads to problems during a so-called "second collision" or impact of the driver with the steering column. The typical collapsible steering column begins to collapse when a pre-determined force, such as a certain amount of impact of the driver on the steering wheel itself is placed on the steering column. This causes separation or rupture of the steering column assembly and the resultant collapse of the steering column. Such collapse, however, is uncontrolled, that is, it proceeds at a rate dependent upon the amount of input force until the steering column bottoms out.

In view of the uncontrolled rate of collapse of previously devised collapsible steering columns, it would be desirable to provide an energy absorption apparatus which would provide a controlled rate of collapse of the apparatus. It would also be desirable to provide an energy absorption apparatus which finds particular advantageous use in a collapsible steering column and which provides a controlled movement of the telescoping steering shaft members during collapse of the steering column. It would also be desirable to provide an energy absorption device which is easily assembled without requiring additional, specially designed brackets, sleeves, and other components for mounting the device on a conventional steering column. It would also be desirable to provide an energy absorption apparatus which is usuable in various applications without requiring extensive modification to existing components. It would be desirable to provide an energy absorption apparatus which can be assembled without the need for additional clips or fasteners to connect the rotatable members of the absorption apparatus and prevent lash between the various components. It would also be desirable to provide an energy absorption apparatus which can be taken apart and re-assembled many times without any effects on the operability of the apparatus. Finally, it would be desirable to provide an energy absorption apparatus which can be formed with any desired energy absorption rate dependent upon the particular application to which it is applied.

SUMMARY OF THE INVENTION

The present invention is an apparatus for absorbing energy between two movable members. The apparatus includes first and second telescopingly engagable members. The first member is rigidly mounted to any support surface. The second member is formed to be increasingly forceably engaged with the first member as force is exerted on the second member urging the second member into the first member.

In a preferred embodiment, a helical twist is formed co-axially along the length of the second member to cause the forceable engagement of the second member into the first member. The helical twist is varied over the length of the second member from a gradually increasing first portion extending from a first end of the second member to an increasingly greater amount of helical twist in a second portion of the second member, thereby providing a controlled force build up as the second member is urged into the first member. The amount of the helical twist can be provided in varying rates and in different sections along the length of the second shaft member.

In an alternate embodiment, knurlings are formed on portions of the exterior surface of the second member thereof. The knurlings gradually increase in depth from the first end of the second member along a first portion of the second member. The depth of the knurlings and the adjacent peaks of the knurlings may be increased in depth so as to increase the height of the peaks of the knurlings radially from the longitudinal axis of the second member. This increases the amount of engagement between the two members as the second member is urged into the first member thereby providing a desired controlled rate of force build up between the first and second members.

The energy absorption apparatus of the present invention overcomes many of the disadvantages encountered with previously devised energy absorption apparatus utilized in many different applications, such as collapsible steering columns, collapsible bumpers, as well as shock absorbers for vehicles.

The present energy absorption apparatus provides significant improvements over previously devised energy absorbing devices, particularly those employed in vehicles, such as automobiles, trucks, etc. The present energy absorption apparatus provides a controlled force build up between two telescoping members as one member is urged into the other under an external force. This increased force build up absorbs the energy of the external force and accomodates increasing external force loads during such force build up.

When employed in a collapsible steering column of a vehicle, the energy absorption apparatus uniquely provides a controlled force build up over the entire length of travel of the collapsible steering shaft member. This provides continual controlled movement of the steering shaft during collapse. Alternately, the force build up rate can be varied as desired for any specified rate build up.

This unique structure also compares favorably with previously devised collapsible steering columns structure which employ breakable or deformable members which initiate telescoping and collapse of the steering column or shaft when a pre-determined fixed load is exerted on the steering column before breaking away to an uncontrolled collapse of the steering column. A further advantage of the use of the present energy absorption apparatus in a collapsible steering column is that the need for additional clips, springs, fasteners, etc. to couple the two telescoping shafts together for simultaneous rotation as well as to prevent looseness between the two members is eliminated. The telescoping member fits securely within the rigidly mounted steering shaft member without lash thereby causing no rattle during operation of the vehicle and resulting deterioration of the steering control of the vehicle. In addition, the two members forming the energy absorption apparatus may be taken apart and re-assembled many times without detrimental effects on the apparatus.

BRIEF DESCRIPTION OF THE DRAWING

The various features, advantages and other uses of the present invention will become more apparent by referring to the following detailed description and drawing in which:

FIG. 1 is an exploded, perspective view of an energy absorption apparatus constructed in accordance with the teachings of one embodiment of the present invention; and FIG. 2 is an exploded, side-elevational view of another embodiment of the energy absorption apparatus of the present invention.

DESCRIPTION OF THE PREFERRED EMBODIMENTS

Throughout the following description and drawing, an identical reference number is used to refer to the same component shown in multiple figures of the drawing.

Referring to the drawing, there is illustrated an energy absorption apparatus which controls the rate of movement of two telescoping members with respect to each other when an external force is exerted on one of the members urging the one member into the other member. A force controlling means creates an increasing force build up as the one member is urged into the other member thereby providing controlled movement between the two members.

The energy absorption apparatus of the present invention may be used in any application where energy must be absorbed at a controlled rate. For example, the energy absorption apparatus of the present invention may be employed advantageously in a collapsible steering column, a movable bumper on a vehicle or a shock absorber.

By way of example only, the energy absorption apparatus constructed in accordance with one embodiment of the present invention is illustrated in FIG. 1 for use in a collapsible steering column. Since the external components, such as the column housing and surrounding support members are conventional, only the components of the energy absorption apparatus forming the present invention will be described and illustrated in FIG. 1. The energy absorption apparatus 10 shown in FIG. 1 includes first and second telescopingly engagable shaft members 12 and 14, respectively. The first shaft member 12 has a hollow, tubular form with a longitudinally extending through bore 16 formed therein. The through bore 16 has a substantially rectangular cross-section formed of two flat walls 18 and 20 and two arcuate side walls 22 and 24.

The second shaft member 14 has the same cross-section as the through bore 16 in the first shaft member 12. That is, the second shaft member 14 has a cross-section formed of substantially flat walls 26 and 28 and two arcuate side walls 30 and 32. The second shaft member 14 is preferably divided into first and second, adjacent sections or portions 34 and 36.

In a normal mounting configuration, the first portion 34 of the second shaft member 14 is telescopingly engaged within one end portion of the first shaft member 12. The outer end of the second portion 36 of the second shaft member 14 is formed with a collar 38 and conventional serrations 40 which receive a standard vehicle steering wheel 42 and mounting clip not shown.

The energy absorption apparatus of the present invention is provided with means, formed on the second shaft member 14, for causing forced engagement of the second shaft member 14 with the first member 12 as the second shaft member 14 is urged into telescopic engagement with the first shaft member 12 under the influence of an external force exerted on the outer end of the second shaft member 14. The external force could, for example, in the application illustrated in FIG. 1, be the impact of a driver of a vehicle on the steering wheel 42 during the collision of the vehicle with an external object.

In a preferred embodiment, the means for causing the force engagement of the first and second shaft members 12 and 14 comprises a helical twist 46 formed co-axially along the longitudinal length of the second shaft member. The helical twist 46 is formed by rotating a portion of the second shaft member 14 about its longitudinal axis.

Preferably, the first end portion 34 of the second shaft member 14 is provided with a first pre-determined amount of helical twist. This amount of helical twist can range between 0° at the forward end 48 of the second shaft member 14 to 2½° to 3° to the end 49 of the first portion 34 of the second shaft member 14.

This provides several advantages, since the first end portion 34 is conventionally mounted within one end portion of the shaft member 12 for normal operation of the steering column. This provides for common rotation of both the first and second shaft members 12 and 14 in a normal manner. Due to the slight degree of helical twist on the first end portion 34 of the second shaft member 14, the first end portion 34 of the second shaft member 14 is urged into a tight fitting engagement with the first end portion of the first shaft member 12. This places both the first and second shaft members 12 and 14 into a pressed fit engagement with the second member 12.

The second portion 36 of the second member 14 is formed with an increasing amount of helical twist ranging between, preferably, 5° to 7° of twist about the longitudinal axis of the second shaft member 14.

In operation, as the second portion 36 of the second shaft member 14 is urged into the through bore 16 and the first member 12 upon the imposition of an impact force on the outer end of the second member 14, the increasing amount of helical twist in the second shaft member 14 will bring the second shaft member 14 into further frictional contact with the interior surfaces of the through bore 14 of the first shaft member 16. This increases the force required to urge the second member 14 further into the first member 12, causing an increased force build-up, resisting such telescoping movement due to the increasing helical twist of the side member 14. This increased force resistance thereby controls the rate of telescoping of the second member 14 with respect to the first member 12 thereby providing a controlled collapse or telescoping of the second member 14 into the first member 12.

An alternate embodiment of the energy absorption apparatus of the present invention is shown in FIG. 2. In this embodiment, the first shaft member 12 is formed identically to that described above and shown in FIG. 1. However, the second shaft member 50 is formed with an alternate embodiment means for causing the forced engagement with the first member 12. The second member 60 is formed with a collar 38 and serrations 40 for connecting the outer end of the second member 52 to the steering wheel 44, not shown in FIG. 2.

The means for causing forced engagement of the second member 50 with the first member 12 is provided by means of a series of knurlings 52 or grooves formed on the upper and lower flat walls 26 and 28 of the second member 50. The knurlings are conventionally formed by means of a machine tool which forms a series of grooves in the exterior surface of the shaft 50. In forming the knurlings 52, material in the second shaft member 50 is deformed to form a groove in the exterior surface of the second shaft member 50, with such material being forced upward to form a peak, such as peak 56 adjacent to the groove 54.

The first portion 58 of the second member is provided with a first series of knurlings 52 which gradually increase in depth from the first end 60 to an intermediate portion 62. Thus, the height of the peak 54 of the knurlings 52 increases in an outwardly tapering manner from the first end 60 to the intermediate portion 62. At the intermediate portion 62, the depth of the knurlings 52 is increased so as to extend in a gradually increasing manner the height of the peaks 54 of the knurlings above the longitudinal axis of the second member 50 in the second portion 66 of the second member 50.

In this manner, as the second member 50 is urged under the influence of an external force into the first member 12, the knurlings 52 will provide an increasing fictional engagement with the interior surfaces of the through bore 16 in the first member 12 thereby providing increased contact between the first and second members 12 and 50 and generating a force rate build up resisting further telescoping movement of the second member 50 into the first member 12.

It should be noted that the amount of forced engagement between the two telescoping members can be varied in any desired, prescribed form to suit any particular application. For example, the amount of helical twist or the depth of knurling in a first portion of a telescoping member may vary in an increasing manner until a prescribed point along the length of the second member and then fall of or remain constant for the remainder of the length of the second member. This would provide definite advantages depending upon the application of the energy absorption apparatus of the present invention. Further, different deflection rates and lead errors may be created by forming the second member accordingly to provide any desired controlled energy absorption rate build up.

In summary, there has been disclosed an unique energy absorption apparatus finding application in many different devices. The energy absorption apparatus includes first and second telescoping members in which the second member is formed with means for providing increasingly forced engagement with the first member as the second member is urged into the first member under the imposition of the external force.

Besides the controlled force build up, the imposition of the means for forcing increased engagement between the first and second members eliminates the need for any additional clips or fasteners required to secure the two members together thereby eliminating any lash or slop between such members which previously resulted in rattle of such members during the operation of the particular device in which the energy absorption device was installed.

What is claimed is:
1. An energy absorption apparatus comprising:
    first and second telescopingly engagable members;
    a longitudinally extending helix formed along the longitudinal axis of the second member for causing forced engagement along the overlapping surfaces of the first and second members as the second member is urged into the first member by an external force;

the first member having a through bore extending longitudinally therethrough for receiving the second member in an increasing friction fit as the second member helically twists into the first member.

2. The energy absorption apparatus of claim 1 wherein:

the second member inncludes first and second portions;

a first pre-determined amount of helix formed in the first portion; and a second pre-determined amount of helix formed in the second portion of the second number.

* * * * *